United States Patent
Shah et al.

(10) Patent No.: US 12,314,441 B1
(45) Date of Patent: May 27, 2025

(54) PRIVACY PRESERVATION WITHIN DATASETS

(71) Applicant: Amazon Technologies, Inc., Reno, NV (US)

(72) Inventors: Syed Kashif Hussain Shah, Santa Clara, CA (US); Kalpit Dixit, Mountain View, CA (US); Yuchen Tian, Mountain View, CA (US); Jie Ma, Seattle, WA (US); Yaser Al-Onaizan, Cortlandt Manor, NY (US)

(73) Assignee: Amazon Technologies, Inc., Reno, NV (US)

( * ) Notice: Subject to any disclaimer, the term of this patent is extended or adjusted under 35 U.S.C. 154(b) by 454 days.

(21) Appl. No.: 17/473,471

(22) Filed: Sep. 13, 2021

(51) Int. Cl.
*G06F 40/40* (2020.01)
*G06F 16/93* (2019.01)
*G06F 21/62* (2013.01)
*G06N 20/00* (2019.01)

(52) U.S. Cl.
CPC .......... *G06F 21/6254* (2013.01); *G06F 16/93* (2019.01); *G06N 20/00* (2019.01)

(58) Field of Classification Search
CPC ...... G06F 21/6254; G06F 16/93; G06N 20/00
See application file for complete search history.

(56) References Cited

U.S. PATENT DOCUMENTS

| | | | |
|---|---|---|---|
| 9,324,022 B2 * | 4/2016 | Williams, Jr. | G06N 3/045 |
| 10,706,848 B1 * | 7/2020 | Greene | G10L 15/30 |
| 11,068,797 B2 * | 7/2021 | Bhide | G06N 20/00 |
| 2010/0318489 A1 * | 12/2010 | De Barros | G06N 5/04 |
| | | | 706/50 |
| 2018/0096102 A1 * | 4/2018 | Akinmeji | G16H 10/60 |
| 2018/0330280 A1 * | 11/2018 | Erenrich | G06N 20/00 |
| 2019/0122078 A1 * | 4/2019 | Ura | G06F 16/00 |
| 2021/0021603 A1 * | 1/2021 | Gibbons | G06F 16/221 |
| 2021/0056405 A1 * | 2/2021 | Bradshaw | G06N 3/08 |
| 2021/0256160 A1 * | 8/2021 | Hachey | G06N 20/00 |
| 2021/0319333 A1 * | 10/2021 | Lee | G06N 3/08 |
| 2022/0027505 A1 * | 1/2022 | Liu | G06F 16/90344 |
| 2022/0092471 A1 * | 3/2022 | Jaeger | G06N 20/20 |
| 2022/0138345 A1 * | 5/2022 | Krishnan | G06N 20/00 |
| | | | 726/26 |

(Continued)

OTHER PUBLICATIONS

Zhang, Tianwei, Zecheng He, and Ruby B. Lee. "Privacy-preserving machine learning through data obfuscation." arXiv preprint arXiv:1807.01860 (2018). (Year: 2018).*

(Continued)

*Primary Examiner* — Mohammad A Siddiqi
(74) *Attorney, Agent, or Firm* — Hogan Lovells US LLP

(57) ABSTRACT

Documents may be evaluated to determine inclusion of one or more types of information, such as personal information. Within the documents containing the one or more types of information, individual spans of information may be replaced with alternative data, which may maintain a type of content associated with the spans. Datasets of documents may be created where one or more types of information have been removed. These datasets may also be evaluated to determine whether one or more elements are over or under represented and then the datasets may be modified, such as by adding or removing documents, to provide an improved balance or distribution of the one or more elements.

18 Claims, 9 Drawing Sheets

(56) References Cited

U.S. PATENT DOCUMENTS

| | | | |
|---|---|---|---|
| 2022/0147654 A1* | 5/2022 | Beach | G06F 21/6254 |
| 2022/0188567 A1* | 6/2022 | Ganesan | G06N 3/02 |
| 2022/0245378 A1* | 8/2022 | Bradley, III | G06V 30/416 |
| 2023/0072913 A1* | 3/2023 | Xu | G06N 20/00 |

OTHER PUBLICATIONS

Shokri R, Shmatikov V. Privacy-preserving deep learning. In Proceedings of the 22nd ACM SIGSAC conference on computer and communications security Oct. 12, 2015 (pp. 1310-1321). (Year: 2015).*

* cited by examiner

PRIVACY PRESERVATION WITHIN DATASETS

BACKGROUND

As computing technology continues to advance, an increasing amount of information may be collected and utilized by entities in order to provide improved content or services to users. Users may provide permission for data acquisition and that data may be used to train various machine learning systems to provide improved recommendations, identify articles within text, or the like. The information collected by these entities may include certain pieces of information a user or provider may preferably want to maintain as confidential. While this information may not be used for training purposes, a motivated individual could extract additional data from the information used to train the machine learning systems.

BRIEF DESCRIPTION OF THE DRAWINGS

Various embodiments in accordance with the present disclosure will be described with reference to the drawings, in which.

DETAILED DESCRIPTION

Figure 1:
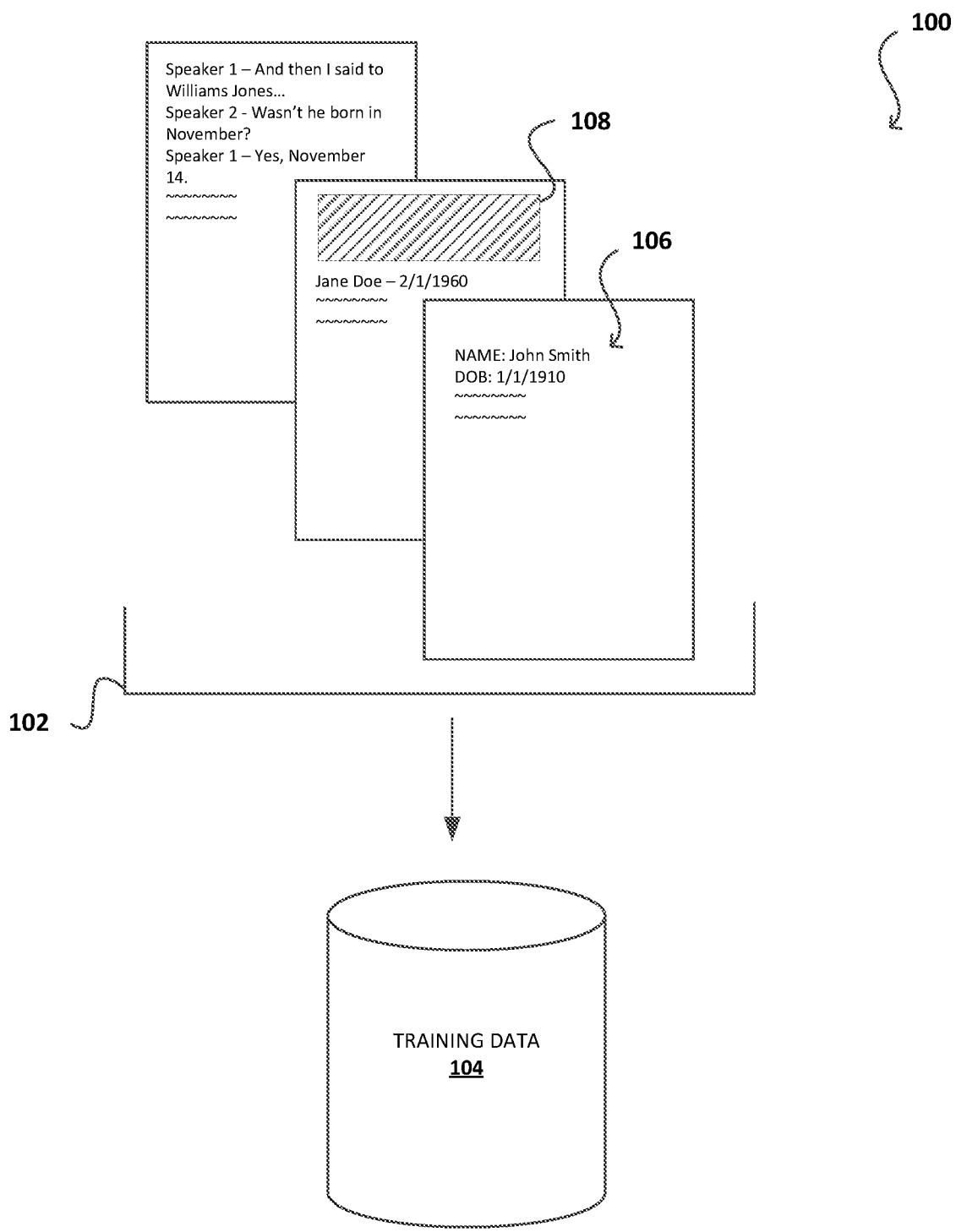
FIG. 1 illustrates an example environment for collecting documents in a dataset in accordance with various embodiments.

Approaches in accordance with various embodiments provide for privacy preservation of information utilized for training one or more machine learning systems. In particular, information may include textual data that may include one or more segments or spans of information a user or a provider may wish to maintain private for users, such as a name or an e-mail address, among other information. Systems and methods of the present disclosure may identify these spans and replace the spans with random values prior to inclusion within a dataset (e.g. set of documents, set) used for training. Accordingly, an automated system may be used to preserve privacy within documents used with training one or more machine learning systems. Various embodiments may eliminate one or more steps of human review, which may eliminate potential data leak points and/or enable larger volumes of data to be used for training purposes.

In at least one embodiment, systems and methods may also be directed toward curating or otherwise developing de-biased training datasets (e.g., training sets) for machine learning systems. For example, data associated with a corpus of information for training one or more machine learning systems may be evaluated for one or more biases, which may be undesirable for training. Documents associated with the one or more biases may then be removed, or additional documents not associated with the one or more biases may be added to the corpus of information. In this manner, a desired or pre-determined balance or sample of information may be obtained, which may provide improved training for the one or more machine learning systems. In at least one embodiment, different training datasets may be established with different biases or distributions according to preferences from one or more users, or in various embodiments, may be curated to support various distributions based, at least in part, on one or more factors such as geographic region, age group, or the like.

Embodiments of the present disclosure may curate a set of documents, which may also be referred to as a dataset, for use with training one or more machine learning models. In at least one embodiment, the dataset include, at least in part, documents with textual data. In at least one embodiment, the dataset may include text documents, images with text, transcribed audio data, free text, or combinations thereof. In at least one embodiment, one or more processing steps may be applied to the documents to identify and/or prepare the textual data, such as an optical character recognition process, natural language processing, audio transcription, or the like. The curated dataset may then be evaluated, using one or more detection modules, to determine whether one or more documents within the dataset includes personally identifiable information (PII), which may be associated with one or more pieces of information that permits the identity of an individual to whom the information applies to be reasonably inferred. Non-limiting examples of PII include, but are not limited to, names, social security numbers, driver's license numbers, dates of birth, addresses, passport numbers, e-mail addresses, and the like. In at least one embodiment, this information is associated with documents or data that a user has provided permission for a provider to collect and to use for purposes such as training machine learning systems.

In at least one embodiment, the detection module may be utilized to filter documents into at least two categories: documents that contain PII information and documents that do not contain PII. Documents that do not contain PII may be separately stored or may undergo one or more other processing steps. Documents containing PII may then be processed, for example using one or more detector modules, to determine spans of PII information within the documents. These spans may then be removed and replaced with different information. The replacement information may be randomized information. In at least one embodiment, replacement information is of a same type as the removed data. For example, replacement information corresponding to a name may start with the letter "A" while replacement data corresponding to a social security number may start with the symbol "@." Replacing this information may then be utilized to create an anonymized version of the document that once contained PII. In at least one embodiment, removal of the non-PII containing documents prior to identifying the spans may reduce computing resources because such documents will not undergo further processing. In at least one embodiment, automatic detection of the PII containing documents and/or the spans may enable larger volumes of data to be processed compared to human annotators.

Various embodiments may further be directed to generating datasets for use with training one or more machine learning systems. After documents have been anonymized, a dataset may be generated using documents that do not contain PII and anonymized documents. In at least one embodiment, it may be desirable to adjust the dataset to obtain a balance or eliminate one or more biases present in training datasets. For example, bias may correspond to certain elements of datasets that are over-represented or under-represented. Because these biased datasets may not accurately represent a model's use case, leading to skewed outcomes and bias toward certain groups of elements, representations for various elements may be adjusted using one or more samplers or balancers. For example, one or more dataset properties may be provided and then different documents may be selected in accordance with those properties. That is, documents may be added or removed from the dataset in accordance with the one or more properties in order to eliminate and/or reduce the bias. As a result, datasets used for training various machine learning systems may be balanced or otherwise sampled in order to reduce one or more biases. In various embodiments, improvements may be made to the various systems for identifying PII by using the generated datasets and human annotated data to improve models. In other embodiments, datasets may be used when training other machine learning models.

FIG. 1 illustrates an example environment 100 where one or more documents 102 are collected to form a dataset (e.g., set, corpus, collection, etc.) of documents 104, which may be used for various operations, such as training data for one or more machine learning systems. In at least one embodiment, the one or more documents 102 may include textual data 106. As shown, textual data 106 may be provided along with other content, such as photographs 108 or other graphics. Furthermore, textual data 106 may be acquired via one or more pre- or post-processing steps. By way of example, textual data 106 may be acquired via one or more optical character recognition steps, natural language processing steps to create a transcript from audio and/or video data, or the like.

In various embodiments, the documents 102 may contain information that one or more users have provided permission for an entity or provider to receive and/or collect. By way of example, the user may provide permission through terms of service and may choose to opt-in or opt-out of data collection. Data collected may then be used for one or more purposes, such as developing the dataset 104 for training one or more machine learning systems, among other uses. In various embodiments, providers may desire to use one or more portions of the information and may want to discard or otherwise obscure the remainder of the information, such as PII. By way of example, the provider may be interested in determining a user's shopping or browsing habits and may not be concerned with the user's name or e-mail address, as that information is unlikely to be useful when developing models or building systems to provide improved recommendations or other features. Accordingly, providers may wish to identify and remove or otherwise obscure this information within the dataset 104.

PII may be not used with the training processes associated with the documents 102, but in various embodiments, motivated actors may obtain access to certain components of information using one or more techniques. For example, machine learning models may rely on large quantities of publicly and privately available information, which as noted above, may include PII. One undesirable artifact of using this information is potential data leakage, which a model may leak or otherwise expose information on which it was trained. With data leakage, a party may try to extract training data because models may store or otherwise remember training examples and could reflect some PII in predictions. For example, next word prediction may potentially expose PII. Such a result is undesirable, and as a result, providers may wish to scrub or otherwise obscure PII.

Various embodiments of the present disclosure may provide systems and methods for obscuring or removing PII to improve user data handling. As noted above, users may provide permission for providers to use their data for a variety of purposes, and that data may go through a variety of phases, such as curating, preprocessing, sampling, human annotations, etc. prior to use. While various security measure may be implemented at each step, it is desirable to eliminate potential points for data leakage. For example, reducing human intervention may be desirable to eliminate potential data leakage where a human reviewer or annotator will potentially have access to PII.

Embodiments of the present disclosure may be directed toward one or more automated systems to identify documents that contain PII, anonymize the documents, and then form a collection or dataset of documents for use with one or more machine learning systems. Various embodiments may also provide for data sampling to reduce biases in datasets.

Figure 2:
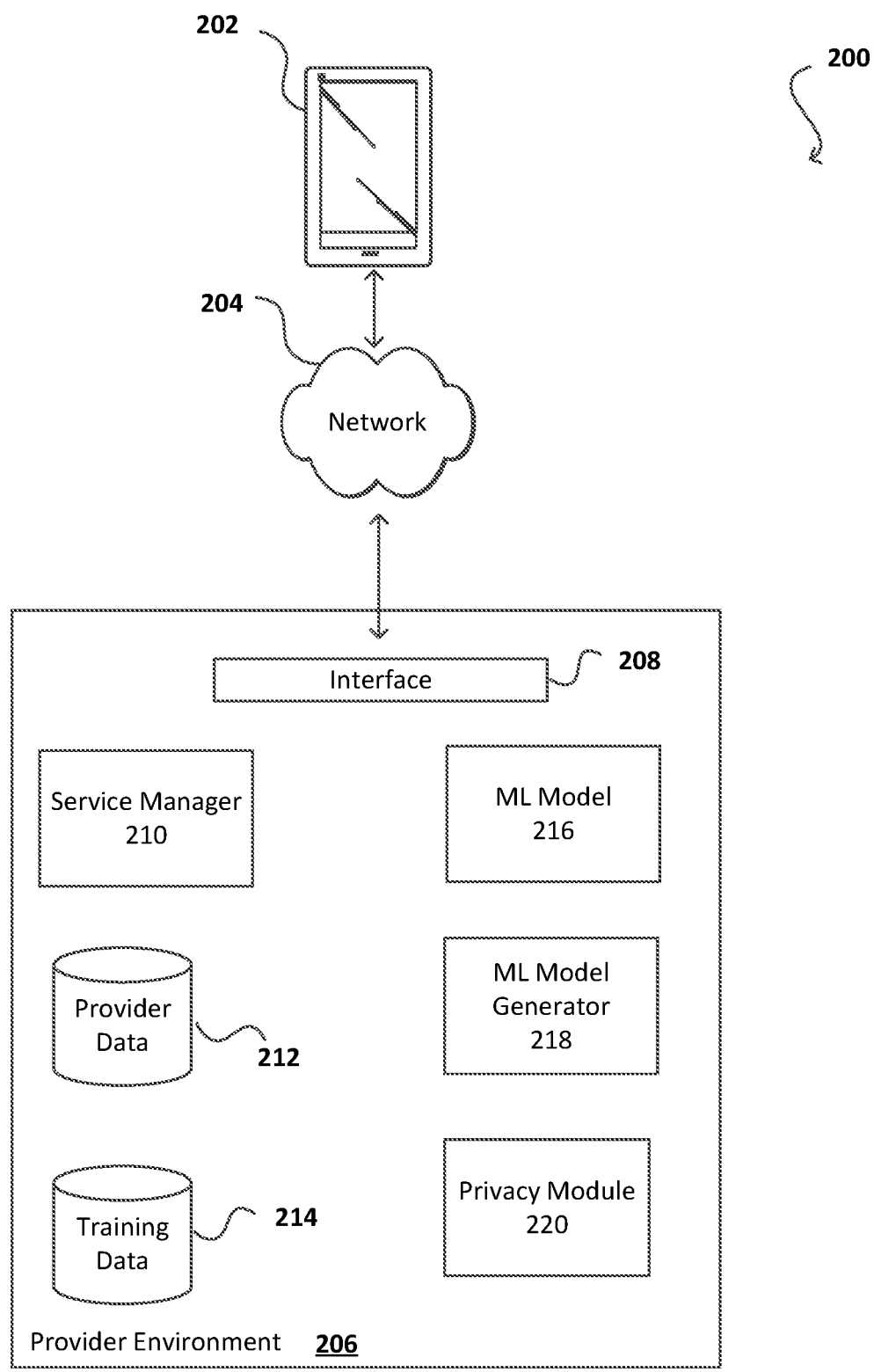
FIG. 2 illustrates an example provider environment that can be utilized to implement aspects in accordance with various embodiments.

FIG. 2 illustrates an example environment 200 in which aspects of the various embodiments can be implemented. In this example, a computing device 202 is able to submit a query, such as a request to perform a task or to access information, across one or more networks 204 to a provider environment 206. The provider environment 206 may refer to one or more hosted tools or extensions associated with one or more resources provided by a provider or accessible to the user. By way of example only, the provider environment 206 may refer to a distributed computing network where one or more services are provided to the user responsive to a request. Additionally, in one or more embodiments, the content provider environment 206 may provide access to content stored for the user, where the user has a set of rights to access the content. The network(s) 204 can include any appropriate network, such as the Internet, a local area network (LAN), a cellular network, an Ethernet, or other such wired and/or wireless network. The content provider environment 206 can include any appropriate resources for providing content or services from a resource provider, as may include various servers, data stores, and other such components known or used for providing content or services from across a network (or from the "cloud").

In this example, a request received to the provider environment 206 can be received by an interface layer 208 of the environment. As known for network environments, the interface layer can include components such as interfaces (e.g., APIs), load balancers, request and/or data routers, and the like. In various embodiments, the request may be for use of one or more services, such as one or more machine learning services that may be provided to a user. These machine learning services may be trained using information acquired by the provider or supplemented/trained with information provided by the user 202. In this example, the request is transmitted to a service manager 210, which can check credentials for the requested service, and if found, provide access to the one or more services associated with the request. The user 202 may then be provided access to an API to submit additional requests/instructions to the service to execute one or more tasks.

In various embodiments, the provider environment 206 may include, or have access to, one or more data stores 212, 214 that includes information that may be utilized to train or otherwise develop one or more machine learning models 216. In this example, the provider data store 212 may include information collected by the provider, for example information associated with one or more users of the provider environment 206 where the user have provided permission to collect and store the information. By way of example only, the provider data store 212 may include information directed toward user browsing history, user purchase history, user content consumption, and the like. Furthermore, in certain embodiments, the information may include pairs or collections of data that are curated and distilled by evaluation of different pieces of data, such as demographic information related to content consumption, location information and associated purchasing history, and the like. As an example, user information may identify different purchases for different regions of a country, such as users in the northern United States purchasing more heavy coats prior to the winter months. Furthermore, in one or more embodiments, the provider data store 212 may also include publicly available information collected or obtained by the provider.

Training data 214 may correspond to information that has been prepared for training or refinement of one or more machine learning models 216. The machine learning models may include various types of prediction services or data evaluation services. Furthermore, the machine learning models may be associated with various associated tools, such as natural language processing models or services to uncover information in unstructured data. The training data 214 may be particularly selected based, at least in part, on a desired purpose for the one or more machine learning models, where different training data may include different identified ground truth labels.

In various embodiments, the environment 206 may include a machine learning model generator 218 that it used to create or otherwise generate a new model, which may be a custom model built using one or more specific characteristics associated with the user and/or a newly trained or adjusted model that used, at least in part, one or more existing machine learning models. The model generator 218 may enable a user to establish one or more criteria for the model, provide or select specific training data, and then generate a particularized model for the user. In various embodiments, the model generator 218 may be provided as a service where the provider environment 206 includes a framework that enables the user to prepare the model, build the model, train and tune the model, and then deploy and manage the model. Furthermore, in certain embodiments, one or more features may be included within the framework such as labeling, data preparation, feature engineering, auto-ML, hosting, and the like. Accordingly, users may utilize the environment 206 to build and establish models for their particular uses or needs with datasets of training data that can be provided by the user, provided by the environment, or a combination thereof. However, it should be appreciated that various embodiments may also be directed toward models developed and hosted by the provider where use of the model is offered as a service to one or more users.

As noted above, various embodiments may be directed toward preserving or enhancing protections for privacy with respect to user data and PII. Systems and methods may further include a privacy module 220, which may be hosted by or associated with the provider environment 206 and/or be accessible to the provider environment 206. In this example, the privacy module 220 may include one or more features to enable detection of PII within one or more documents, such as detectors or classifiers that have been trained to determine whether one or more portions of text are indicative of PII. Furthermore, the privacy module 220 may be utilized to replace PII with one or more random values or alternative values, which may also preserve a type for the information, such as having particular values for different types (e.g., names start with a certain letter, email addresses start with a certain number, names are replaced with a label such as "[NAME]", etc.).

In various embodiments, the privacy module 220 may further include one or more samplers or balancers in order to reduce biases within datasets used in training data. Accordingly, different datasets may be generated, which may be based, at least in part, on instructions provided by the user. Accordingly, various embodiments may enable the privacy module 220 to modify or otherwise add different datasets to the training data store 214 and/or to establish a new training data store. Furthermore, the privacy module 220 may include one or more models associated with the ML models 216 and may further be utilized to train and refine those models.

Figure 3:
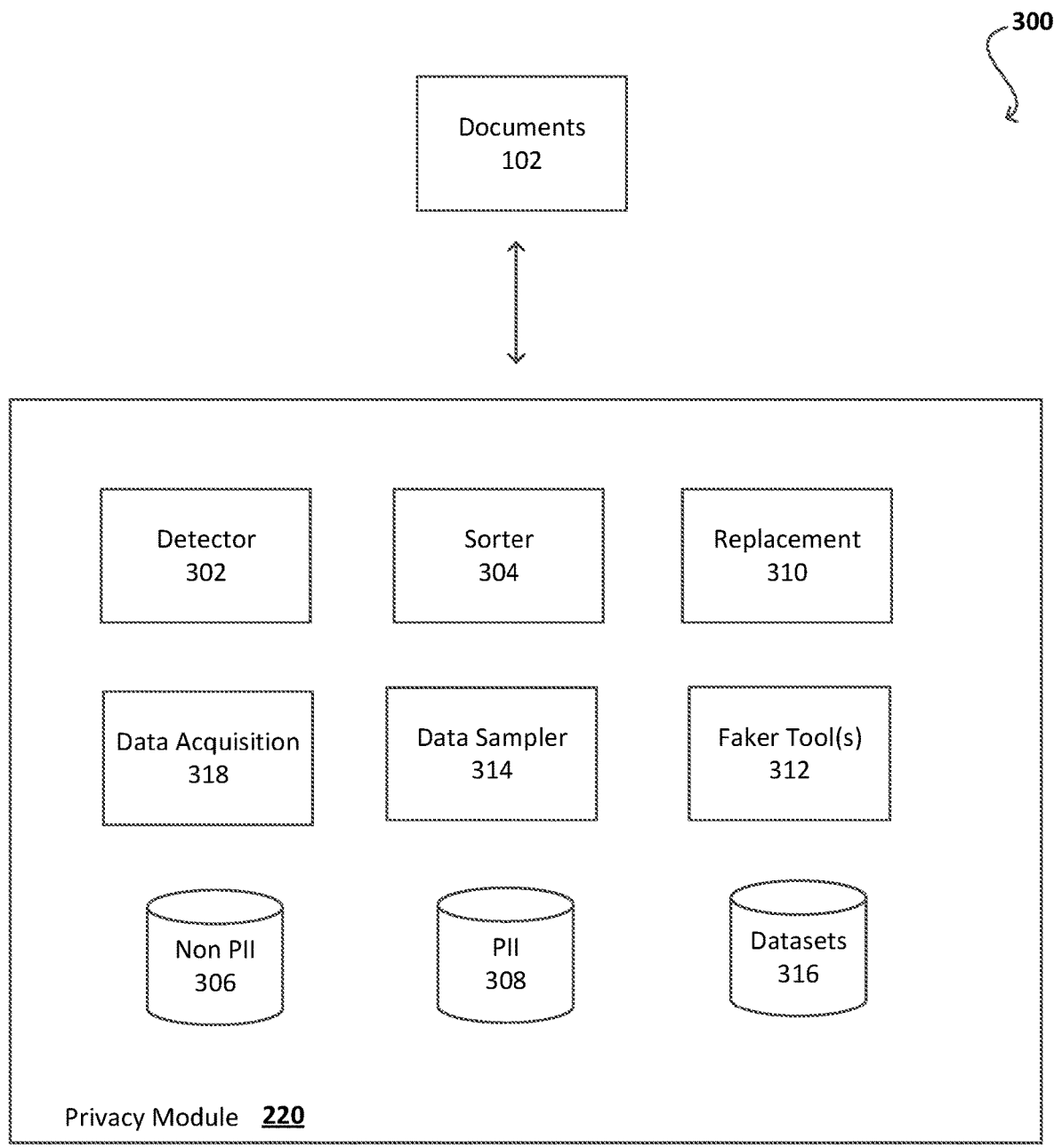
FIG. 3 illustrates an example privacy module that can be utilized to implement aspects in accordance with various embodiments.

FIG. 3 illustrates an environment 300 in which embodiments of the present disclosure may be practiced. In this example, the privacy module 220 may receive one or more documents 102, such as documents from the provider data store 212, the training data 214, and/or from a user to anonymize and prepare the documents for use with one or more machine learning systems. It should be appreciated that like numerals may be used for like components for convenience and that such use is not intended to limit the scope of the present disclosure.

In this example, the privacy module 220 receives the documents 102, for example via the one or more networks 204 and/or via access to one or more data stores that may include the one or more documents 102. The one or more documents 102 are processed via the privacy module 220 in order to generate one or more datasets, which may be used to train one or more machine learning systems, among other applications. In this example, a detector 302 may receive the one or more documents 102, which may be a curated dataset of documents, and evaluate the documents for PII. The detector 302 may include one or more machine learning classifiers that has been trained to identify information associated with PII, such as recognizing names, e-mail addresses, phone numbers, and the like. In various embodiments, the classifiers may be further refined using information acquired by the privacy module 220. The detector 302 may provide information to a sorter 304 to sort the documents 102 into at least two categories, such as documents that include PII and documents that do not. It should be appreciated that other classifications may also be used, such as sorting into different types of PII, sorting by quantity of PII, and the like.

Documents that do not contain PII may be stored, at least temporarily, within a non-PII data store 306. It should be appreciated that, rather than storing the documents, the documents may be tagged or otherwise identified, such as by including metadata associated with the document. By sorting or otherwise separating the documents, resources may be conserved by not undergoing further processing steps on documents that do not include PII. Furthermore, in one or more embodiments, documents that do contain PII may be stored within a data store 308, at least temporarily, or may, as noted above, be tagged or otherwise marked for further processing.

Documents that do include PII may be further processed, for example by using the detector 302 to identify spans of PII within the document and/or using a replacement module 310 to remove or otherwise replace the spans of PII. For example, the identified spans may be categorized by type, such as a first type corresponding to a name, a second type corresponding to a phone number, and so forth. One or more faker tools 312 may be used to randomly generate values for substitution within the document. It should be appreciated that the randomly generated values may, at least in part, maintain type information for the spans. For example, spans corresponding to names may be replaced with certain types of value while spans corresponding to birth dates may be replaced with different types of values.

In various embodiments, the faker tools 312 may correspond to one or more APIs used to generate fake or otherwise random data. It should be appreciated that various different tools may be utilized, such as one or more open source applications, and different faker tools may be used for different types of data. The faked information may then be replaced within the document, for example with the replacement module 310, and a new, modified, anonymized document is generated. For example, a name may be replaced with a new generated value. Moreover, in various embodiments, rather than generating new data, the names or other PII may be replaced with labels, such as "[NAME]" or "[ADDRESS]" or any other label that obscures the content of the PII while maintaining a type associated with the PII. As will be appreciated, this new document may no longer contain PII. These newly generated documents may be stored, for example within one or more data stores such as the data store 306 and/or within a separate data store. Furthermore, newly generated documents may also be marked or otherwise tagged as newly generated and not including PII.

In various embodiments, a data sampler 314, which may also be referred to as a balancer, may be used to generate one or more datasets, which may be stored within the dataset data store 316. As noted herein, training datasets may be biased such that certain elements are over or under-represented. Accordingly, the data sampler 314 may evaluate one or more factors or features of the information to determine whether certain elements are over/under represented, for example based on a baseline or a dataset distribution, and then add or remove documents when generating the dataset. In at least one embodiment, a data acquisition module 318 may receive information, for example from the user, which may include one or more properties for the datasets. For example, the properties may specify demographic information, geographic information, or the like for the dataset. This information may then be utilized by the data sampler 314 when adding or removing documents from the dataset to achieve a dataset having the properties specified by the user and/or provider. In this manner, various datasets may be generated and then stored for use, for example as training data for one or more machine learning systems.

Figure 4:
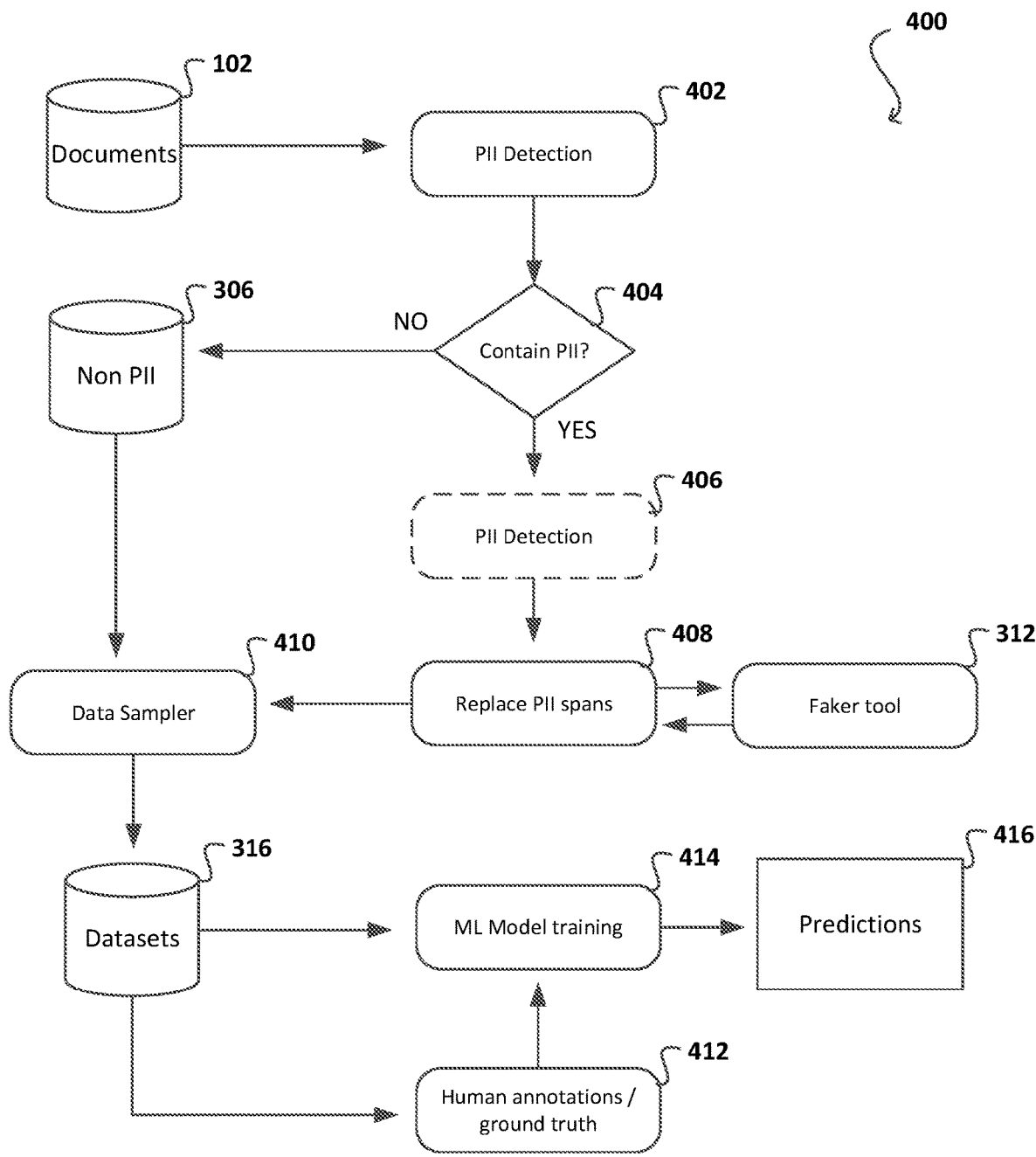
FIG. 4 illustrates an example processing pipeline in accordance with various embodiments.

FIG. 4 illustrates a pipeline 400 illustrating a privacy preserving and debiasing operation in accordance with one or more embodiments of the present disclosure. In this example, the documents 102 may be provided for PII detection 402, such as via the detector 302. It should be appreciated that the documents 102 may be a curated dataset (e.g., a curated set of documents), such as documents particularly selected for the operations or documents having one or more particular properties.

The detector 302 may include one or more classifiers to separate documents between those that do contain PII and those that do not 404, where those that do not contain PII are stored within the data store 306. In certain examples, the pipeline includes additional evaluation via the detector 302, for example using one or more different classifiers, to identify spans of PII within the documents 406. It should be appreciated that, in various embodiments, the span detection may occur while the PII containing documents are detected.

Documents with their identified spans may then be processed 408, such as using the replacement module 310 that may direct documents or information to the faker tools 312 and replace the identified spans with randomized or otherwise false information. By way of example, documents including spans with names may be replaced with random strings of characters or generated names that do not correspond to one or more names within the documents 102. In at least one embodiment, types of documents are maintained such that certain documents may have one or more common identifiers, such as all replacements for names beginning with the number "9" or with the character "*". In this manner, types may be maintained within the documents, which may be useful for one or more later operations.

As noted above, various embodiments of the present disclosure may also be utilized to remove bias from datasets. For example, the newly generate documents may be combined with documents from the non-PII data store 306 in order to generate one or more datasets. However, these documents may over or under-represent certain elements, which may be undesirable for training because subsequent models trained on that data will suffer from the same inaccuracies of the biases. Accordingly, the data sampler 314 may be used to evaluate documents and add or remove documents from datasets in accordance with one or more properties. In at least one embodiment, the properties may be directed toward demographic information, geographic information, and the like. Furthermore, in embodiments, the properties may be particularly selected for certain circumstances or applications for the user, which may, in various embodiments, lead to particularized datasets of training data.

One or more datasets may be formed and stored within the data store 316, which may then be used as training data along with human annotations or ground truth information 412 to train one or more machine learning models 414. These models may then output predictions 416 based, at least in part, on the training data. In this manner, documents used to train the models may be stripped of PII using one or more automated methods, thereby enabling a larger dataset to be utilized for training.

Figure 5:
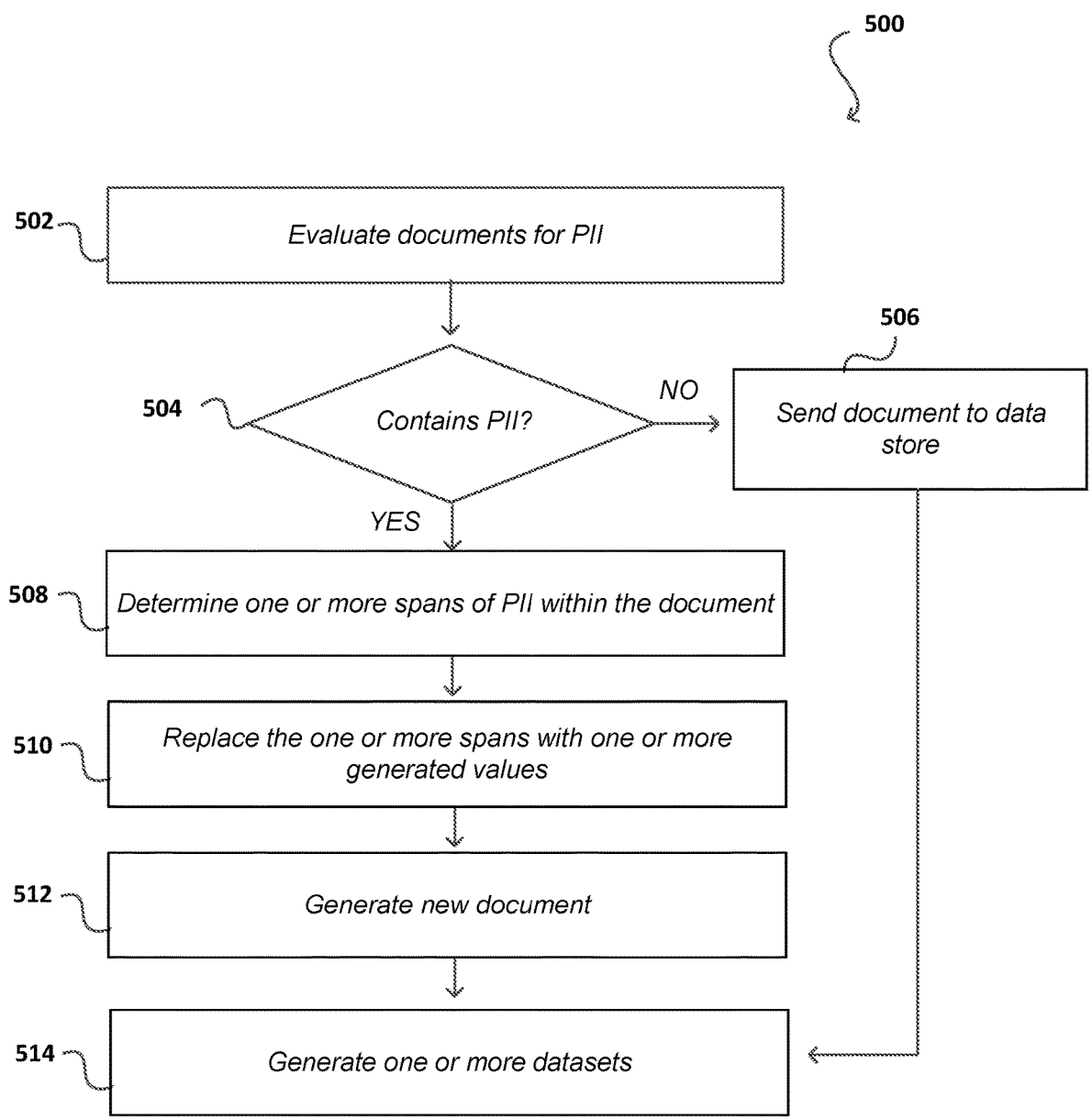
FIG. 5 illustrates a process for generating datasets in accordance with various embodiments.

FIG. 5 is a flow chart of an example process 500 for generating one or more datasets. It should be understood that, for any process discussed herein, there can be additional, fewer, or alternative steps, performed in similar or different orders, or in parallel, within the scope of the various embodiments unless otherwise stated. In the example, documents are evaluated for the presence of PII 502. For example, one or more classifiers may be utilized to evaluate documents to determine whether one or more types of PII are present within the document. A determination may be made whether the document includes PII 504, and if not, then the document may be separated and stored within one or more data stores 506. Removing the document from the pipeline where there is no PII may conserve processing resources. It should be appreciated that, in various embodiments, the document may not be separately stored and may be tagged or otherwise identified as not including PII.

For documents containing PII, one or more spans of PII may be determined within the document 508. By way of example, documents may include several different types of PII and each of those spans may be identified. In various embodiments, the one or more spans are replaced with one or more generated values 510. That is, the textual data representative of the PII is replaced with alternative data that is not the PII, such as a random string of characters, a randomly generated type of information, a predetermined label, or a combination thereof. Replacement of the spans may lead to the generation of new documents 510, which may be combined with the previously identified non-PII containing documents to generate one or more datasets 512. In this manner, PII may be removed from documents within a dataset prior to utilization of the dataset, for example as training data for one or more machine learning systems.

Figure 6:
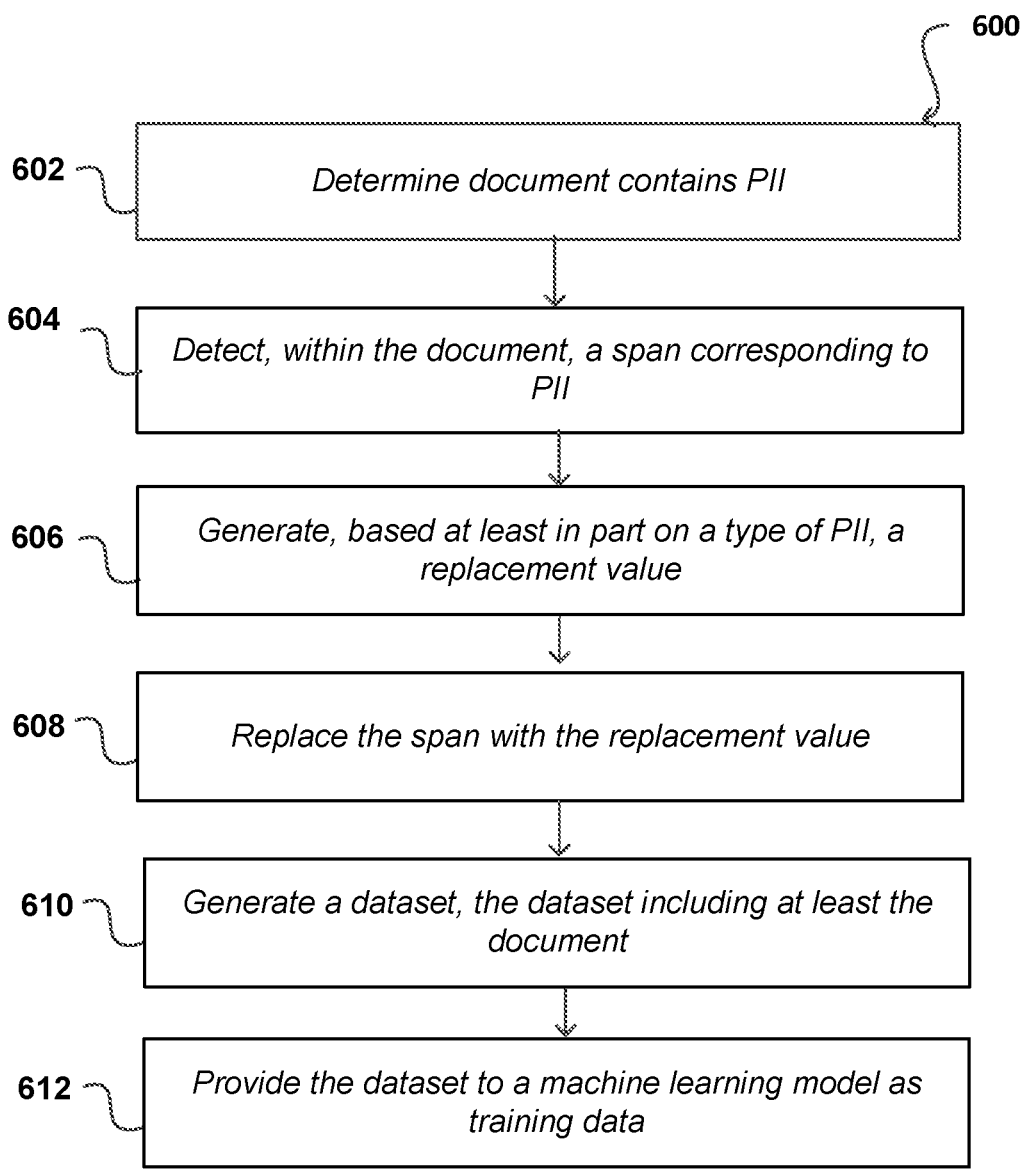
FIG. 6 illustrates a process for generating datasets in accordance with various embodiments.

FIG. 6 is a flow chart of an example process 600 for generating one or more datasets as training data for a machine learning system. In this example, a determination is made that a document contains PII 602. A span corresponding to the PII is identified 604. It should be appreciated that multiple spans may be present within the document and that, in various embodiments, different spans may correspond to different types of PII. In at least one embodiment, the type of span may be labeled or otherwise provided as metadata for later evaluation. In various embodiments, a replacement value or replacement content is generated for the span 606. The replacement value may be based, at least in part, on the type of span. For example, different types of spans may include different information or indicators to enable identification of the type of PII that was removed or otherwise replaced. By way of example, the replacement value may have a consistent appearance or presentation for different types, such as including corresponding characters in different locations for different types of PII. It should be appreciated that replacement value and/or replacement content may refer to multiple different values or pieces of content. For example, if the original span was for a name that included 3 words, the replacement value and/or replacement content may include three different portions or strings of characters/symbols. Accordingly, reference to a replacement value should not be interpreted as only including a single value, but may include multiple, separate characters, symbols, labels, sequences of characters, sequences of symbols, sequences of labels, or combinations thereof.

In at least one embodiment, the span is replaced with the replacement value 608. That is, the PII is removed from the document and the replacement value is inserted into the document in its place. As a result, the document may no longer contain PII. A dataset may be generated, where the dataset includes at least the document having had the PII removed 610. In other words, at least one document where PII has been removed may be used to populate at least a portion of one or more datasets. The dataset may then be provided as training data to one or more machine learning models 612. In this manner, training data may be anonymized using one or more automated processes to reduce a likelihood of data leakage or inadvertent exposure of PII.

Figure 7:
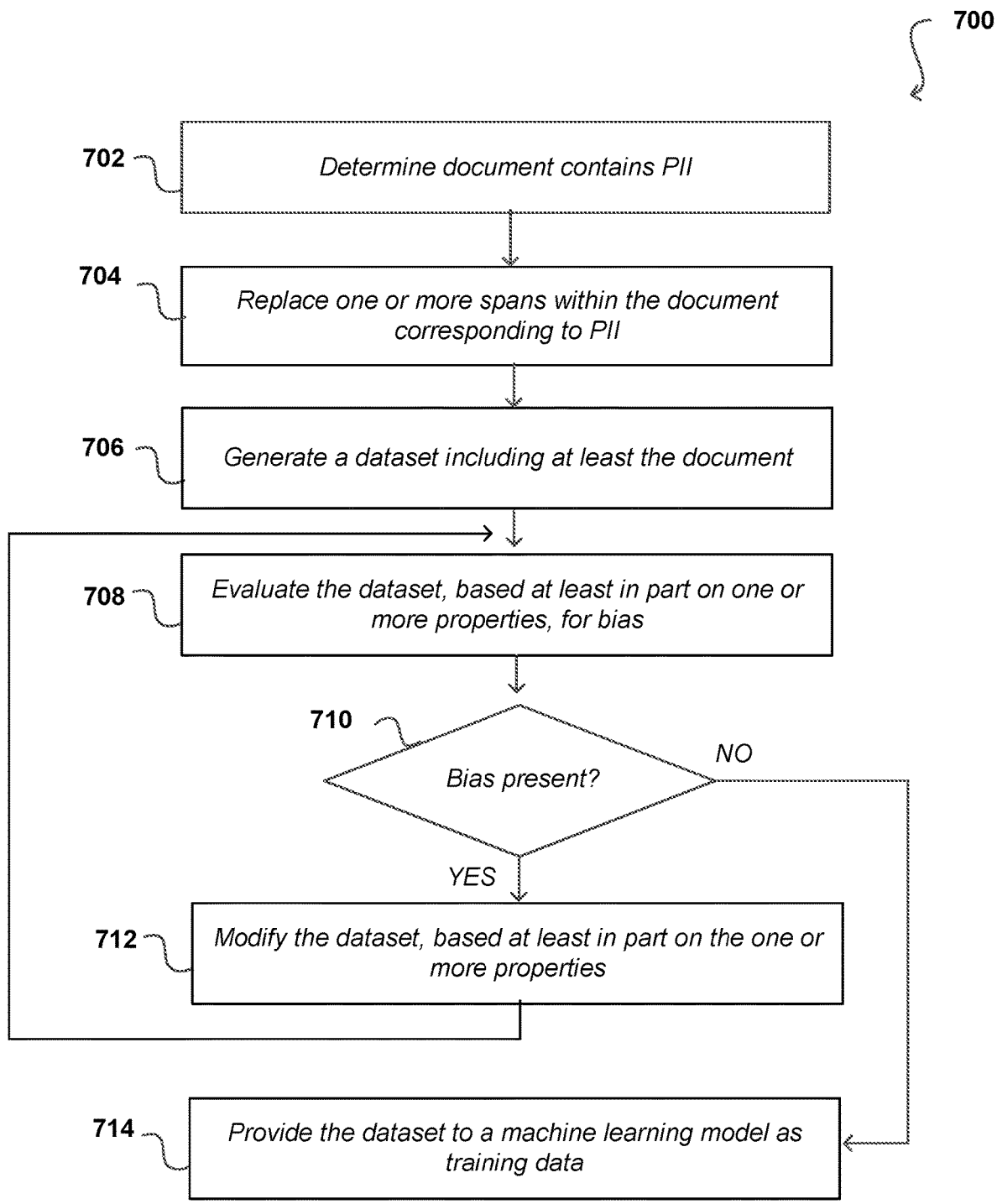
FIG. 7 illustrates a process for generating datasets in accordance with various embodiments.

FIG. 7 is a flow chart of an example process 700 for balancing a dataset. In this example, one or more documents are identified as including PII 702. As noted above, the PII may be identified using one or more classifiers and, moreover, spans within the documents corresponding to the PII may also be determined. One or more spans within the document corresponding to the PII are replaced 704. In various embodiments, the spans are replaced with randomized or generated information. The randomized or generated information may be random character strings, different types of information corresponding to a type of PII, or combinations thereof. The replacement of the spans may lead to generation of one or more new documents.

A dataset may be generated 706, where the dataset includes one or more documents that have had spans of PII replaced. The dataset may be evaluated for bias 708. Bias may be determined, at least in part, using one or more properties. The one or more properties may be provided by a user or by a provider. The bias may correspond to under or over-representation of one or more elements. By way of example only, for a domain corresponding to a country population, bias may be present where demographic information, such as age distribution or city/urban dwelling, does not align with the documents being utilized. These biases, when used as training data, may impart the biases into the model, which may be undesirable because subsequent predictions output from the model may not be representative of the target population. A determination is made regarding bias within the dataset 710, where if it is determined bias is present, then the dataset may be modified 712. For example, the dataset may be modified by adding or removing documents, where the documents added or removed may be identified as contributing to the bias. If it is determined no bias is present, then the dataset may be provided to a machine learning system for use as training data 714. In this manner, anonymized documents where privacy is preserved may be utilized while also balancing documents to remove bias to improve model training.

Figure 8:
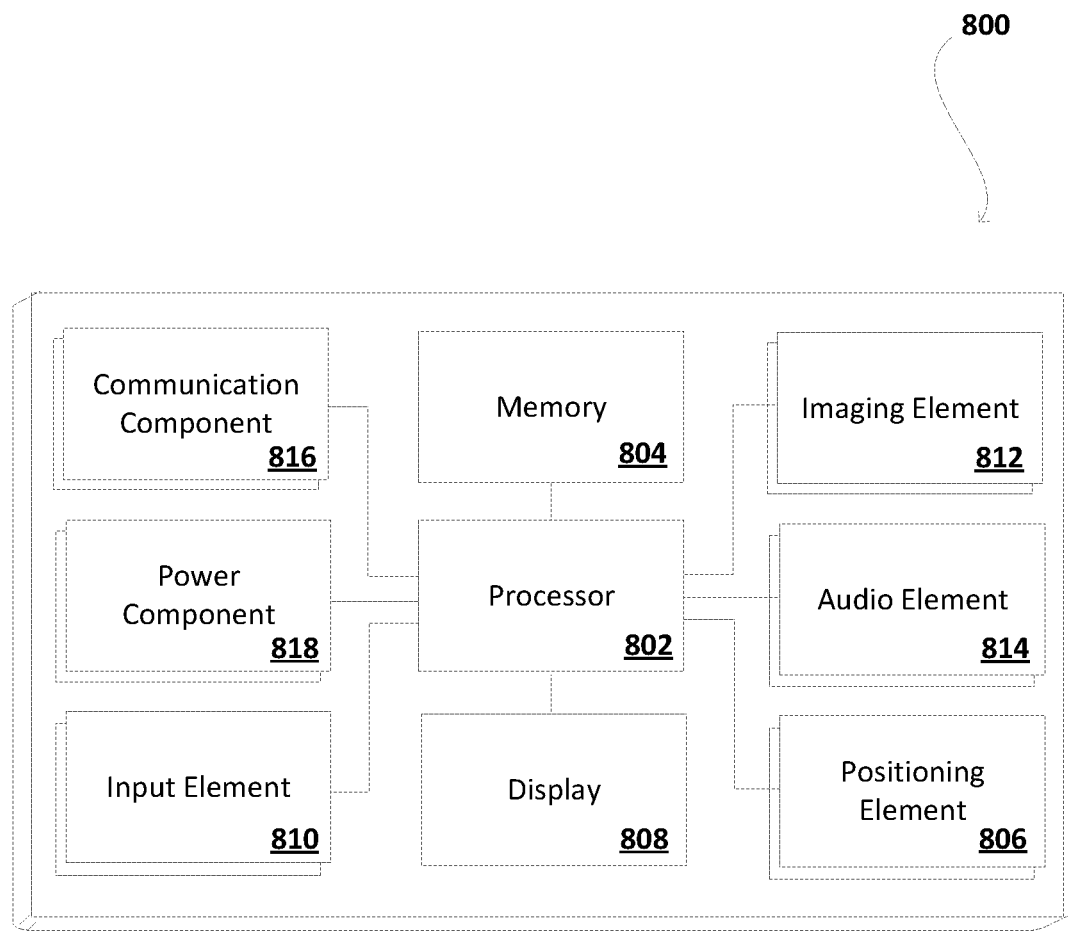
FIG. 8 illustrates example components of a computing device that can be used to implement aspects of the various embodiments.

FIG. 8 illustrates a set of basic components of an electronic computing device 800 that can be utilized to implement aspects of the various embodiments. In this example, the device includes at least one processing unit 802 for executing instructions that can be stored in a memory device or element 804. As would be apparent to one of ordinary skill in the art, the device can include many types of memory, data storage, or computer-readable media, such as a first data storage for program instructions for execution by the processing unit(s) 802, the same or separate storage can be used for images or data, a removable memory can be available for sharing information with other devices, and any number of communication approaches can be available for sharing with other devices. The device typically will include some type of display screen 806, such as a touch screen, electronic ink (e-ink), organic light emitting diode (OLED) or liquid crystal display (LCD), although devices such as portable media players might convey information via other means, such as through audio speakers.

As discussed, the device in many embodiments will include at least one imaging element 808, such as one or more cameras that are able to capture images of the surrounding environment and that are able to image a user, people, or objects in the vicinity of the device. The image capture element can include any appropriate technology, such as a CCD image capture element having a sufficient resolution, focal range, and viewable area to capture an image of the user when the user is operating the device. Methods for capturing images using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device.

The example computing device 800 also includes at least one orientation determining element 810 able to determine and/or detect orientation and/or movement of the device.

Such an element can include, for example, an accelerometer or gyroscope operable to detect movement (e.g., rotational movement, angular displacement, tilt, position, orientation, motion along a non-linear path, etc.) of the device 800. An orientation determining element can also include an electronic or digital compass, which can indicate a direction (e.g., north or south) in which the device is determined to be pointing (e.g., with respect to a primary axis or other such aspect).

As discussed, the device in many embodiments will include at least a positioning element 812 for determining a location of the device (or the user of the device). A positioning element can include or comprise a GPS or similar location-determining elements operable to determine relative coordinates for a position of the device. As mentioned above, positioning elements may include wireless access points, base stations, etc., that may either broadcast location information or enable triangulation of signals to determine the location of the device. Other positioning elements may include QR codes, barcodes, RFID tags, NFC tags, etc., that enable the device to detect and receive location information or identifiers that enable the device to obtain the location information (e.g., by mapping the identifiers to a corresponding location). Various embodiments can include one or more such elements in any appropriate combination.

As mentioned above, some embodiments use the element(s) to track the location of a device. Upon determining an initial position of a device (e.g., using GPS), the device of some embodiments may keep track of the location of the device by using the element(s), or in some instances, by using the orientation determining element(s) as mentioned above, or a combination thereof. As should be understood, the algorithms or mechanisms used for determining a position and/or orientation can depend at least in part upon the selection of elements available to the device.

The example device also includes one or more wireless components 814 operable to communicate with one or more electronic devices within a communication range of the particular wireless channel. The wireless channel can be any appropriate channel used to enable devices to communicate wirelessly, such as Bluetooth, cellular, NFC, or Wi-Fi channels. It should be understood that the device can have one or more conventional wired communications connections as known in the art.

The device also includes a power system 816, such as may include a battery operable to be recharged through conventional plug-in approaches, or through other approaches such as capacitive charging through proximity with a power mat or other such device. Various other elements and/or combinations are possible as well within the scope of various embodiments.

In some embodiments the device can include at least one additional input device 818 able to receive conventional input from a user. This conventional input can include, for example, a push button, touch pad, touch screen, wheel, joystick, keyboard, mouse, keypad, or any other such device or element whereby a user can input a command to the device. These I/O devices could even be connected by a wireless infrared or Bluetooth or other link as well in some embodiments. Some devices also can include a microphone or other audio capture element that accepts voice or other audio commands. For example, a device might not include any buttons at all, but might be controlled only through a combination of visual and audio commands, such that a user can control the device without having to be in contact with the device.

In some embodiments, the device can have sufficient processing capability, and the imaging element and associated analytical algorithm(s) may be sensitive enough to distinguish between the motion of the device, motion of a user's head, motion of the user's eyes and other such motions, based on the captured images alone. In other embodiments, such as where it may be desirable for the process to utilize a fairly simple imaging element and analysis approach, it can be desirable to include at least one orientation determining element that is able to determine a current orientation of the device. In one example, the at least one orientation determining element is at least one single- or multi-axis accelerometer that is able to detect factors such as three-dimensional position of the device and the magnitude and direction of movement of the device, as well as vibration, shock, etc. Methods for using elements such as accelerometers to determine movement of a device are also known in the art and will not be discussed herein in detail. Other elements for detecting orientation and/or movement can be used as well within the scope of various embodiments for use as the orientation determining element. When the input from an accelerometer or similar element is used along with the input from the camera, the relative movement can be more accurately interpreted, allowing for a more precise input and/or a less complex image analysis algorithm.

Example environments discussed herein for implementing aspects in accordance with various embodiments are primarily Web-based, as relate to Web services and cloud computing, but it should be appreciated that, although a Web-based environment is used for purposes of explanation, different environments may be used, as appropriate, to implement various embodiments. Client devices used to interact with various embodiments can include any appropriate device operable to send and receive requests, messages, or information over an appropriate network and convey information back to a user of the device. Examples of such client devices include personal computers, smart phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections, and combinations thereof.

It should be understood that there can be several application servers, layers, or other elements, processes, or components, which may be chained or otherwise configured, which can interact to perform tasks as discussed and suggested herein. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio, and/or video to be transferred to the user, which may be served to the user by the Web server in the form of HTML, XML, or another appropriate structured language in this example. The handling of all requests and responses, as well as the delivery of content between a client device and a resource, can be handled by the Web server. It should be understood that the Web and application servers are not required and are merely example components, as structured code discussed herein can be executed on any appropriate device or host machine as discussed elsewhere herein.

A data store can include several separate data tables, databases, or other data storage mechanisms and media for storing data relating to a particular aspect. The data store is operable, through logic associated therewith, to receive instructions from a server, and obtain, update, or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a Web page that the user is able to view via a browser on the user device. Information for a particular item of interest can be viewed in a dedicated page or window of the browser.

Each server typically will include an operating system that provides executable program instructions for the general administration and operation of that server, and typically will include a non-transitory computer-readable medium storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are described. Thus, the depictions of various systems and services herein should be taken as being illustrative in nature, and not limiting to the scope of the disclosure.

Various aspects can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and other non-transitory computer readable media for containing code, or portions of code, can include any appropriate media known or used in the art, including storage media and communication media, such as but not limited to volatile and non-volatile, removable and non-removable media implemented in any method or technology for storage of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

Figure 9:
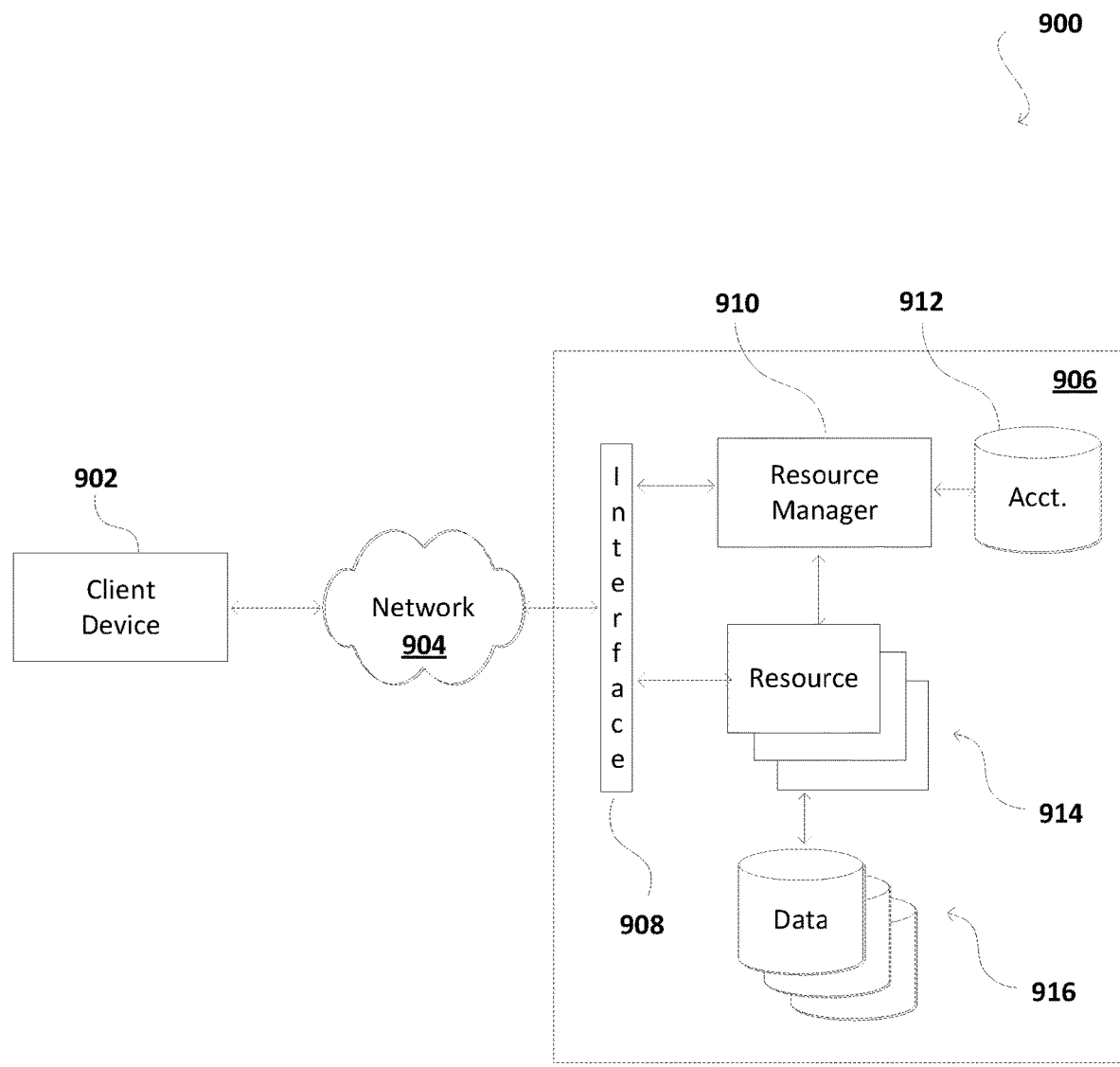
FIG. 9 illustrates an example environment in which various embodiments can be implemented.

FIG. 9 illustrates an example environment 900 in which aspects of the various embodiments can be implemented. In this example a user is able to utilize a client device 902 to submit requests across at least one network 904 to a multi-tenant resource provider environment 906. The client device can include any appropriate electronic device operable to send and receive requests, messages, or other such information over an appropriate network and convey information back to a user of the device. Examples of such client devices include personal computers, tablet computers, smart phones, notebook computers, and the like. The at least one network 904 can include any appropriate network, including an intranet, the Internet, a cellular network, a local area network (LAN), or any other such network or combination, and communication over the network can be enabled via wired and/or wireless connections. The resource provider environment 906 can include any appropriate components for receiving requests and returning information or performing actions in response to those requests. As an example, the provider environment might include Web servers and/or application servers for receiving and processing requests, then returning data, Web pages, video, audio, or other such content or information in response to the request.

In various embodiments, the provider environment may include various types of resources that can be utilized by multiple users for a variety of different purposes. As used herein, computing and other electronic resources utilized in a network environment can be referred to as "network resources." These can include, for example, servers, databases, load balancers, routers, and the like, which can perform tasks such as to receive, transmit, and/or process data and/or executable instructions. In at least some embodiments, all or a portion of a given resource or set of resources might be allocated to a particular user or allocated for a particular task, for at least a determined period of time. The sharing of these multi-tenant resources from a provider environment is often referred to as resource sharing, Web services, or "cloud computing," among other such terms and depending upon the specific environment and/or implementation. In this example the provider environment includes a plurality of resources 914 of one or more types. These types can include, for example, application servers operable to process instructions provided by a user or database servers operable to process data stored in one or more data stores 916 in response to a user request. As known for such purposes, the user can also reserve at least a portion of the data storage in a given data store. Methods for enabling a user to reserve various resources and resource instances are well known in the art, such that detailed description of the entire process, and explanation of all possible components, will not be discussed in detail herein.

In at least some embodiments, a user wanting to utilize a portion of the resources 914 can submit a request that is received to an interface layer 908 of the provider environment 906. The interface layer can include application programming interfaces (APIs) or other exposed interfaces enabling a user to submit requests to the provider environment. The interface layer 908 in this example can also include other components as well, such as at least one Web server, routing components, load balancers, and the like. When a request to provision a resource is received to the interface layer 908, information for the request can be directed to a resource manager 910 or other such system, service, or component configured to manage user accounts and information, resource provisioning and usage, and other such aspects. A resource manager 910 receiving the request can perform tasks such as to authenticate an identity of the user submitting the request, as well as to determine whether that user has an existing account with the resource provider, where the account data may be stored in at least one data store 912 in the provider environment. A user can provide any of various types of credentials in order to authenticate an identity of the user to the provider. These credentials can include, for example, a username and password pair, biometric data, a digital signature, or other such information. The provider can validate this information against information stored for the user. If the user has an account with the appropriate permissions, status, etc., the resource manager can determine whether there are adequate resources available to suit the user's request, and if so, can provision the resources or otherwise grant access to the corresponding portion of those resources for use by the user for an amount specified by the request. This amount can include, for example, capacity to process a single request or perform a single task, a specified period of time, or a recurring/renewable period, among other such values. If the user does not have a valid account with the provider, the user account does not enable access to the type of resources specified in the request, or another such reason is preventing the user from obtaining access to such resources, a communication can be sent to the user to enable the user to create or modify an account, or change the resources specified in the request, among other such options.

Once the user is authenticated, the account verified, and the resources allocated, the user can utilize the allocated resource(s) for the specified capacity, amount of data transfer, period of time, or other such value. In at least some embodiments, a user might provide a session token or other such credentials with subsequent requests in order to enable those requests to be processed on that user session. The user can receive a resource identifier, specific address, or other such information that can enable the client device 902 to communicate with an allocated resource without having to communicate with the resource manager 910, at least until such time as a relevant aspect of the user account changes, the user is no longer granted access to the resource, or another such aspect changes.

The resource manager 910 (or another such system or service) in this example can also function as a virtual layer of hardware and software components that handles control functions in addition to management actions, as may include provisioning, scaling, replication, etc. The resource manager can utilize dedicated APIs in the interface layer 908, where each API can be provided to receive requests for at least one specific action to be performed with respect to the data environment, such as to provision, scale, clone, or hibernate an instance. Upon receiving a request to one of the APIs, a Web services portion of the interface layer can parse or otherwise analyze the request to determine the steps or actions needed to act on or process the call. For example, a Web service call might be received that includes a request to create a data repository.

An interface layer 908 in at least one embodiment includes a scalable set of user-facing servers that can provide the various APIs and return the appropriate responses based on the API specifications. The interface layer also can include at least one API service layer that in one embodiment consists of stateless, replicated servers which process the externally-facing user APIs. The interface layer can be responsible for Web service front end features such as authenticating users based on credentials, authorizing the user, throttling user requests to the API servers, validating user input, and marshalling or unmarshalling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, users of the control service. The servers of the Web services layer can be stateless and scaled horizontally as known in the art. API servers, as well as the persistent data store, can be spread across multiple data centers in a region, for example, such that the servers are resilient to single data center failures.

The specification and drawings are, accordingly, to be regarded in an illustrative rather than a restrictive sense. It will, however, be evident that various modifications and changes May be made thereunto without departing from the broader spirit and scope of the invention as set forth in the claims.

What is claimed is:

1. A computer-implemented method, comprising:
   determining a document from a plurality of documents includes personally identifiable information (PII);
   determining, within the document, two or more spans corresponding to the PII, the two or more spans including metadata corresponding to an individual span type;
   replacing a first span of the two or more spans with one or more first replacement values, the one or more first replacement values corresponding to the individual span type associated with the first span of the two or more spans;
   replacing a second span of the two or more spans with one or more second replacement values, different from the one or more first replacement values, the one or more second replacement values corresponding to the individual span type associated with the second span of the two or more spans;
   generating a dataset, the dataset including at least the document and at least one other document from the plurality of documents;
   determining the dataset includes one or more biases corresponding to one or more elements that are over-represented or under-represented within the dataset, based at least in part on one or more dataset properties; and
   modifying the dataset, based at least in part on the one or more dataset properties.

2. The computer-implemented method of claim 1, wherein modifying the dataset includes at least one of removing one or more documents from the dataset or adding one or more documents to the dataset.

3. The computer-implemented method of claim 1, wherein one or more elements of the one or more replacement values are maintained with common PII types.

4. The computer-implemented method of claim 3, further comprising:
   determining a second document of the plurality of documents does not contain PII; and
   storing the second document within a data store.

5. The computer-implemented method of claim 1, wherein the modified dataset is used as training data for one or more machine learning systems.

6. A computer-implemented method, comprising:
   determining a document of a plurality of documents contains information associated with a plurality of identified categories;
   determining a first span within the document corresponding to a first identified category of the plurality of identified categories;
   determining a second span within the document corresponding to a second identified category of the plurality of identified categories;
   generating metadata, for the first span and the second span, identifying individual span types for the first span and the second span;
   generating a modified document, the modified document replacing the first span and the information associated with the first span with first replacement content and the second span and second information associated with the second span with second replacement content, different from the first replacement content, based on the respective individual span types; and
   generating a dataset of documents including at least the modified document, the dataset of documents including a distribution of documents associated with one or more preferences for a target model.

7. The computer-implemented method of claim 6, wherein at least one of the first identified category or the second identified category is personally identifiable information associated with one or more users of a service.

8. The computer-implemented method of claim 6, wherein at least one of the first replacement content or the second replacement content is one of a randomly generated sequence of characters or a label.

9. The computer-implemented method of claim 6, further comprising:
   comparing one or more elements associated with the dataset to one or more properties; and
   determining the dataset contains a bias with respect to the one or more elements.

10. The computer-implemented method of claim 9, further comprising:
    modifying the dataset based, at least in part, on the bias, by adding or removing one or more documents.

11. The computer-implemented method of claim 6, further comprising:
    receiving the plurality of documents;
    determining at least of portion of the plurality of documents do not contain information associated with the plurality of identified categories; and identified category; and
    storing the at least portion of the plurality of documents.

12. The computer-implemented method of claim 11, wherein at least some of the portion of the plurality of documents are included within the dataset.

13. The computer-implemented method of claim 6, wherein one or more faker tools generate at least one of the first replacement content or the second replacement content.

14. A system, comprising:
at least one processor; and
memory including instructions that, when executed by the at least one processor, cause the system to:
  determine a document of a plurality of documents contains information associated with a plurality of identified categories;
  determine a first span within the document corresponding to a first identified category of the plurality of identified categories;
  determine a second span within the document corresponding to a second identified category of the plurality of identified categories;
  generate metadata, for the first span and the second span, identifying individual span types for the first span and the second span;
  generate a modified document, the modified document replacing the first span and the information associated with the first span with first replacement content and the second span and second information associated with the second span with second replacement content, different from the first replacement content, based on the respective individual span types; and
  generate a dataset of documents including at least the modified document, the dataset of documents including a distribution of documents associated with one or more preferences for a target model.

15. The system of claim 14, wherein the instructions when executed further cause the system to:
  compare one or more elements associated with the dataset to one or more properties; and
  determine the dataset contains a bias with respect to the one or more elements.

16. The system of claim 15, wherein the instructions when executed further cause the system to:
  modify the dataset based, at least in part, on the bias, by adding or removing one or more documents.

17. The system of claim 14, wherein the instructions when executed further cause the system to:
  receive the plurality of documents;
  determine at least of portion of the plurality of documents do not contain information associated with the plurality of identified categories; and identified category; and
  store the at least portion of the plurality of documents.

18. The system of claim 17, wherein at least some of the portion of the plurality of documents are included within the dataset.

* * * * *